C. W. T. KRAUSCH.
ENGINE RECORDER.
No. 36,411. Patented Sept. 9, 1862.
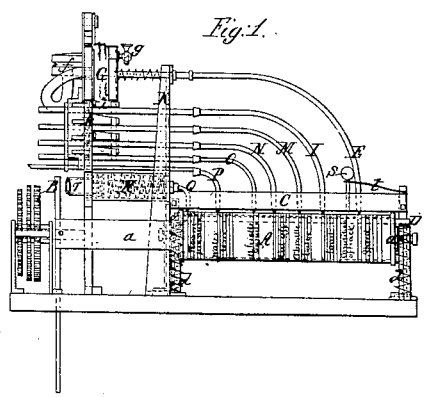
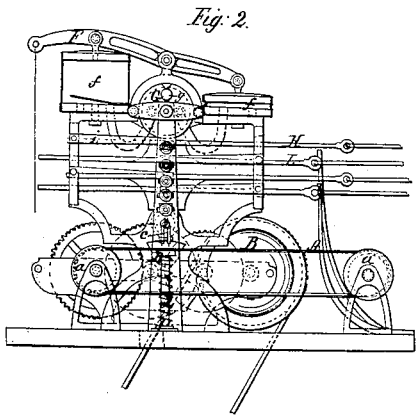
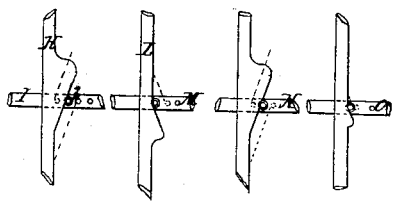
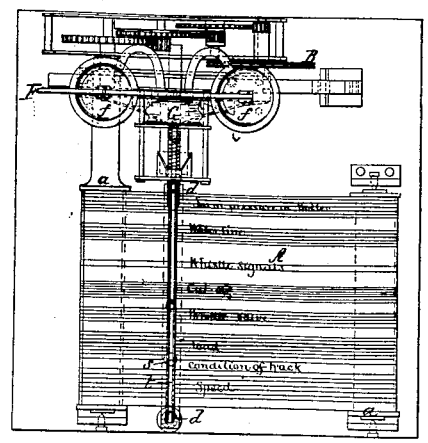

UNITED STATES PATENT OFFICE.

C. W. THEODORE KRAUSCH, OF CHICAGO, ILLINOIS.

IMPROVEMENT IN ENGINE-INDICATORS.

Specification forming part of Letters Patent No. 36,411, dated September 9, 1862.

*To all whom it may concern:*

Be it known that I, C. W. THEODORE KRAUSCH, of Chicago, in the county of Cook and State of Illinois, have invented a new and useful Improvement in Engine Indicators and Recorders; and I do hereby declare that the following is a full, clear, and exact description of the same, reference being had to the annexed drawings, making a part of this specification, and to the letters of reference marked thereon.

The object of this invention is to indicate and record the various facts connected with the operation of a locomotive or other engine in such a manner that they will be combined together and include the desired data in a single view; and it consists in combining a rotating or traversing record-sheet with markers that are caused to vary in position by suitable connections with those parts of the engine upon the operations of which the desired facts may be dependent.

To enable others skilled in the art to make and use my invention, I will proceed to describe its construction and operation.

Figure 1 of the drawings is a side elevation of the indicator and recorder of my invention, designed for application to a locomotive. Figs. 2 and 3 represent, respectively, a front elevation and a plan of the same; and Fig. 4 includes parts in detail of the said machine.

The paper, A, or any other suitable material on which the record may be made, is prepared with longitudinal lines designating the various degrees of the operations registered, as may be particularly seen in Fig. 3. It is attached to an endless belt working over two rollers, *a a*, from one of which it receives the motion that has been transmitted through the train of gear-wheels from the pulley B, that may be driven by a belt from a pulley on one of the truck-axles. The paper will thus have a motion corresponding with the progress of the engine, as the truck-wheels never slip, and the belt should be of sufficient extent to admit a diagram, which will illustrate the operations on any desired length of journey.

The record-paper is combined with carbonized transfer-paper, or it may be chemically prepared to discolor by contact with a metal marking-point or style. A pair of parallel bars, C, extend transversely over the paper and serve as guides for the recording points or markers, that will be hereinafter described.

D is an elastic bed, having springs *d d* to press it uniformly against the marking-points.

The marker E indicates and records the speed of the engine. It is operated by the lever F, which receives a reciprocating motion from any convenient part of the engine, and works a pair of bellows-pumps, *f f*, that receive air through ordinary valves and deliver it to the spring-balanced bellows G. This last-mentioned bellows has a small blow-cock, *g*, and carries the upper end of the recording-marker E, attached to its moving cover. The air forced into the bellows G when the engine is in motion compresses the spring of the cover before it can escape through the cock *g*, and indicates by the position of the marker the degree of speed at which it is working.

If the speed of the engine should be slackened, the air will escape more readily, and the bellows will be partially collapsed by the pressure of the spring, and the position of the point of the marker will be shifted in a corresponding degree. In a similar manner, if the speed should be increased, the bellows will be expanded and the point moved outward on the paper. As the paper will have been moved longitudinally during these transverse motions of the marker, the line traced by the point will be compounded of both motions and indicate their relative character.

If the engine were started with twenty revolutions per minute, for instance, the point would assume the position indicating that velocity; and so long as that speed was retained it would mark a longitudinal line on the paper corresponding with the distance traversed by the paper and proportional to that traveled by the engine; and if the speed were gradually increased to fifty revolutions the point would be gradually extended until it marked in a similar manner a line indicating that degree of speed, and in the meanwhile it would have traced a diagonal line more or less abrupt, depending upon the time and consequent amount of paper that had passed during the change. The character of the line made by the marker that is varied in position by the speed of the engine upon the the paper that is moved by the progress of the locomotive exhibits any and every variation of speed that may have occurred during the journey.

The load drawn by the engine is indicated by the position of the draw-bar, and I transfer this indication to my instrument by connecting the draw-bar of the locomotive or of the tender to the slide-bar H, which has an inclined plane or wedge on one of its edges, as shown in Fig. 4. The marker I bears upon the paper and records the variations of the traction in a similar manner to the speed-marker E. It is steadied by passing through the standard K and the guide $k$, and has a pin, $a$, which is pressed against the incline of the slide by the spring $i$, attached to the frame. The variations of the extension of the draw-bar will thus be transmitted by the inclined plane and spring to the marking-point working across the paper. The character of the line composed by the transverse motions of the marker and the longitudinal motion of the paper will indicate, as in the case of the speed-record, the amount of load that has been drawn by the engine, and in a like manner the treatment to which the load has been subjected will be recorded. The amount and the variations of the load, sudden stoppages, jerkings, and backings will all be marked and form a register of the management of the engine-driver.

The amount of opening of the throttle-valve is registered on the record-paper in a similar manner by connecting the slide-bar L to the throttle-valve gearing and operating the marker M by an inclined plane and a pin and spring like those attached to the load-marker before described. The degree of expansion is recorded in the same manner by the attachment of the marker N to a part of the cut-off or reversing-gear. The whistle-signals are also recorded by connecting the whistle-handle to the marker O with a similar arrangement. The position of the water-line also is constantly indicated and recorded while the engine is in motion by the marker P, operated by a float in the boiler.

The steam-pressure in the boiler is recorded by the marker Q, attached to a piston in the small steam-cylinder R, which is connected by the pipe $r$ to the upper part of the boiler. The piston is pressed to the bottom of the cylinder by a helical spring, which is compressed by the pressure of the steam, and the degree of compression, and therefore the pressure of the steam, is registered by the marker on the record-paper. The pressure of steam in the cylinders and steam-chests may also be indicated by means of similar spring pistons and markers.

The condition of the track is indicated and recorded by the marker attached to the weight S, which is suspended on the flexible spring $t$. The jumping of the weight thus balanced marks the passage of the engine over rough parts of the road.

It is manifest from the construction and operation of my locomotive-recorder above described that a continuous record will be obtained of the different performances of the engine at every point of the distance traveled. The record-paper exhibits the speed and the force of traction employed at any point, and as all the indications are made on a transverse line on the paper, which may correspond with a station or any other determined part of the road or journey, the superintendent may calculate the cost of transportation over any section. The quantity of steam used may be estimated from the records of the pressure and the expansion, and the management of the engine-driver will be indicated by the record of jerkings and backings, signals and water, and the due consideration of the other items that illustrate the manner in which he has handled his engine and performed his duty.

This indicator and recorder may be applied to a stationary engine or to any steam, caloric, or other variety of engine to furnish a combined record of the different features of its performance and to enable an estimate to be made of the relative values of the different principles of operation and styles of construction.

The described arrangement of parts operating the speed-marker may be attached to the throttle-valve or expansion-gear for the purpose of regulating the speed of the engine as a governor. When the marker was unduly extended, the supply of steam would be partially shut off, and if the engine worked too slowly the steam-valve would be further opened.

I claim as my invention and desire to secure by Letters Patent—

The indicator and recorder constructed and operated substantially as described, for the purpose of making a combined record of the performances of an engine.

C. W. THEODORE KRAUSCH.

Witnesses:
C. E. GRAY,
H. C. AKIN.